UNITED STATES PATENT OFFICE.

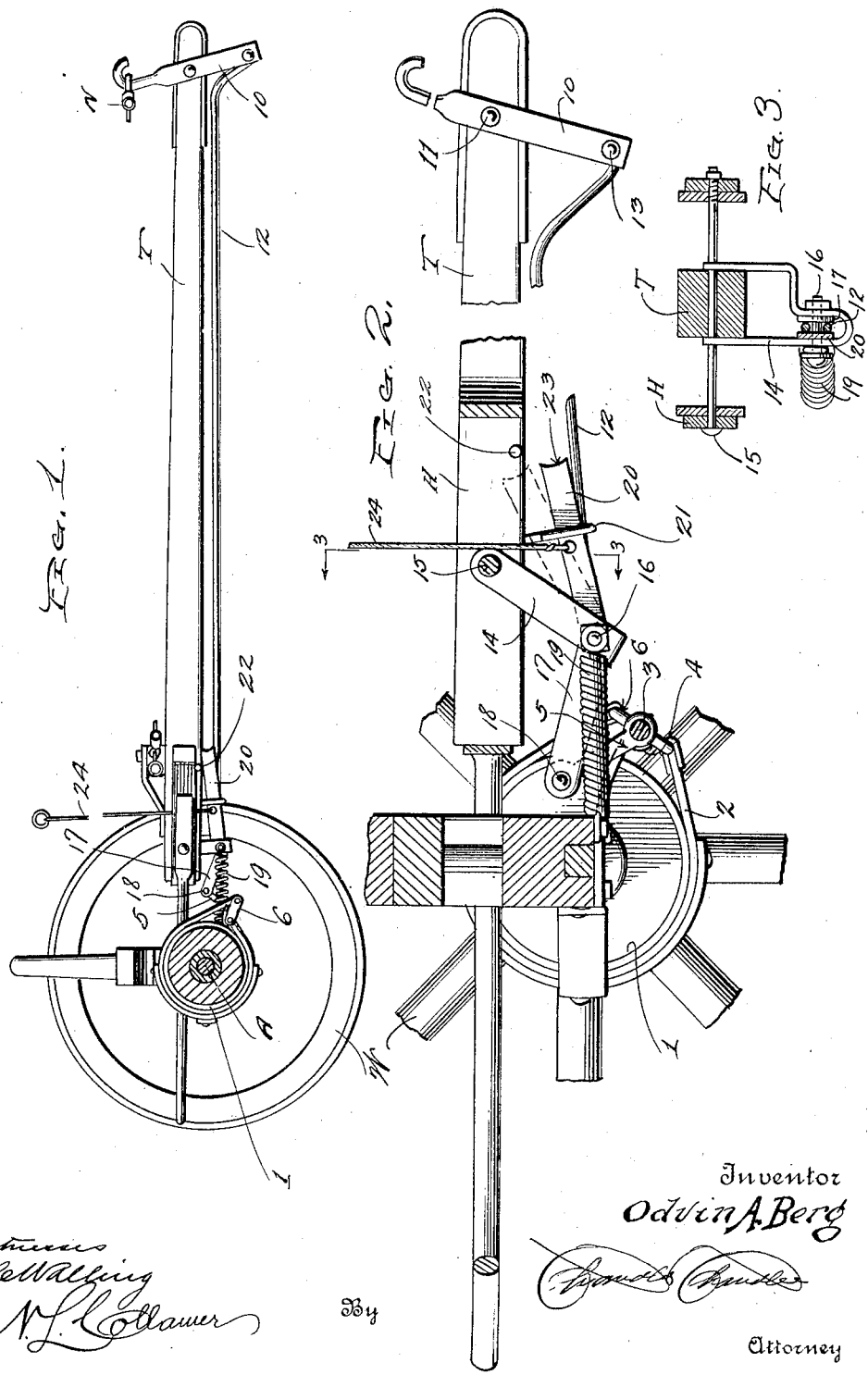

ODVIN A. BERG, OF WHITEHALL, WISCONSIN.

AUTOMATIC WAGON-BRAKE.

1,385,772.  Specification of Letters Patent.  Patented July 26, 1921.

Application filed January 6, 1920. Serial No. 349,743.

*To all whom it may concern:*

Be it known that I, ODVIN A. BERG, a citizen of the United States, residing at Whitehall, in the county of Trempealeau, State of Wisconsin, have invented certain new and useful Improvements in Automatic Wagon-Brakes; and I do hereby declare the following to be a full, clear, and exact description of the invention, such as will enable others skilled in the art to which it appertains to make and use the same.

This invention relates to carriages and wagons, and more especially to automatic brakes; and the object of the same is to improve the general construction of the brake applying means and particularly to provide a novel and simple latching mechanism for holding said means against movement at the will of the driver.

One practical embodiment of the invention is described below and shown in the drawings wherein:

Figure 1 is a side elevation of the complete brake as applied to the front wheels of a vehicle, the nearer front wheel being in section to show a brake drum on its hub, and the remote wheel being indicated only in outline. In this view the brakes are set.

Fig. 2 is a sectional detail taken across the front axle near its center, just inside one of the hounds, and showing the rear portion only of the tongue. In this view the parts are in the position which they assume when the brakes are not set, and the dotted lines show the position of the latch when it is raised to prevent the automatic setting of the brakes.

Fig. 3 is a cross section on the line 3—3 of Fig. 2.

In the drawings are shown only the front axle A having wheels W and hounds H, the tongue T pivoted at its rear end between said hounds, and the neck yoke N here shown as a bar carried from the necks of the horses or attached to their collars and which is therefore moved rearward and upward when their heads are raised or drawn to the rear as by tightening on the reins in bringing them to a stop or holding back while descending grades.

The brake mechanism in the present case is illustrated as consisting of a drum 1 fixed on or formed around the inner end of the hub of each wheel, a brake shoe which in this case is a band 2 inclosing the drum, a brake beam which in this case is a shaft 3 mounted within bearings 4 carried by the axle A and having at its midlength an upstanding brake lever 5, and connections such as loops or forks 6 at the ends of the beam or shaft whereby its movement in its bearings will tighten the bands on the drums and apply the brake. It may be stated at this point, however, that any other suitable form of brake mechanism proper might be employed, so long as a forward movement on the brake lever or equivalent element causes the application of the brakes. They may be held normally inactive by means not necessary to show.

The automatic brake actuating mechanism includes a lever 10 pivoted at its midlength at 11 to the forward end of the tongue T and carrying the neck yoke N at its upper end, a rod 12 pivoted at 13 to the lower end of the lever and leading back beneath the tongue to a yoke 14 whose body underlies the tongue and whose upper end is pivoted astride the same, preferably on the bolt or pin 15 which connects the tongue with the hounds, the rod being pivoted at 16 within said yoke, and a link 17 whose front end is mounted on the pivot 16 and whose rear end is pivoted at 18 to the brake lever 5; and by preference a contractile spring 19 connects the yoke with the axle so as to draw the entire brake operating mechanism to the rear and therefore throw it out of action—in fact this spring may also serve to hold the brakes normally inactive, because in the present case it would rock the shaft and will loosen the brake bands around the drums.

When now the driver draws in on the reins, or the team automatically holds back on the neck yoke, the movement of the latter to the rear relative to the tongue swings the lever 10, and through the rod 12, swings the yoke which, through the link and brake lever, applies the brakes automatically. When the team again moves forward so that back pressure on the neck yoke is released, the brakes are automatically moved to inactive position.

An important feature of the invention lies in the means for latching it against automatic action at the will of the operator. Mounted at its rear end on the pivot 16 through said yoke is a latch 20 extending forward and playing freely in a guide 21 which may be a staple depending from the tongue, and the latter also carries a fixed stop 22 with which the front end of the latch may engage when it is raised but with which it will not engage when it lies at the lower end of the staple or guide. Its front end may be dished slightly as shown at 23, and the stop may be a stout screw or pin in or through the tongue T. This latch is raised by the driver, and for such purpose a wire, chain, or cord 24 leads from it upward to within his reach. It will be obvious that when he draws on this device the tip of the latch will be lifted to a point directly behind the stop, and thereafter should anything move the neck yoke to the rear and draw on the rod 12, the forward swing of the yoke is prevented by contact of the latch with its stop, and the brakes cannot be applied automatically unless this yoke swings forward. Therefore the driver is at liberty to throw the latch into action so as to render the brake inactive. If the element 24 be a cord or chain, a loop or link therein may be engaged over a pin or hook on his foot rest or seat, which would hold this mechanism entirely out of action without further attention on his part.

What is claimed is:

1. In an automatic brake, the combination with brake mechanism proper adapted for application to the front wheels of a vehicle; of a lever pivoted to the tongue and adapted for connection at its upper end with the neck yoke, a yoke whose arms are pivoted astride the tongue at its rear end, means connecting its bend both with the brake mechanism and the lower end of said lever, a latch pivoted to said bend and extending forward along the tongue, a guide on the latter supporting the front end of the latch, means for raising this end manually at will, and a stop on the tongue for coaction with the raised latch to prevent the application of the brakes.

2. In an automatic brake for application to the front wheels of a vehicle, the combination with the brake mechanism proper including drums on said wheels, bands around them, a rocking brake shaft connected with said bands, and a lever on the shaft; of a lever pivoted to the front end of the tongue and carrying a neck yoke at its upper end, a yoke pivotally suspended from the rear end of the tongue, a rod leading from the lower end of the lever to and pivoted to the bend of the yoke, and a link leading from the lever on the brake shaft and also pivoted to the bend of the yoke.

In testimony whereof I affix my signature in the presence of two witnesses.

ODVIN A. BERG.

Witnesses:
ALICE M. LARSON,
OLE J. EGGUM.